United States Patent
Hikita

(10) Patent No.: US 9,321,313 B2
(45) Date of Patent: Apr. 26, 2016

(54) MOTORCYCLE TIRE FOR UNEVEN TERRAIN

(71) Applicant: Sumitomo Rubber Industries Ltd., Kobe-shi (JP)

(72) Inventor: Masahiro Hikita, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 636 days.

(21) Appl. No.: 13/730,029

(22) Filed: Dec. 28, 2012

(65) Prior Publication Data

US 2013/0167992 A1    Jul. 4, 2013

(30) Foreign Application Priority Data

Dec. 29, 2011    (JP) .................................. 2011-290318

(51) Int. Cl.
*B60C 11/11*    (2006.01)
*B60C 1/00*    (2006.01)
*B60C 11/00*    (2006.01)

(52) U.S. Cl.
CPC ............. *B60C 11/00* (2013.01); *B60C 11/0058* (2013.04); *B60C 11/11* (2013.01); *B60C 2011/0025* (2013.04); *B60C 2011/016* (2013.04); *B60C 2013/006* (2013.04); *B60C 2200/10* (2013.04); *B60C 2200/14* (2013.04)

(58) Field of Classification Search
CPC .... B60C 2200/10; B60C 1/00; B60C 1/0016; B60C 1/0025; B60C 11/0008; B60C 2011/0016; B60C 2011/0025; B60C 2011/0033; B60C 11/0041; B60C 2011/016; B60C 2013/005; B60C 2013/006; B60C 2013/007

USPC .......................................... 152/209.5, 209.11
See application file for complete search history.

(56) References Cited

U.S. PATENT DOCUMENTS 4,773,463 A * 9/1988 Okuni et al. .................. 152/546

FOREIGN PATENT DOCUMENTS

| JP | 4-365601 A | 12/1992 |
|---|---|---|
| JP | 2008-285081 | * 11/2008 |
| JP | 2010-195059 | * 9/2010 |

(Continued)

OTHER PUBLICATIONS

WO 2010/119959, Oct. 2010, English language machine translation, [https://patentscope.wipo.int/search/en/detail.jsf?docId=WO2010119959&recNum=2&maxRec=3&office=&prevFilter=&sortOption=Pub+Date+Desc&queryString=FP%3A%282010119959%29&tab=FullText].*

(Continued)

*Primary Examiner* — Eric Hug
(74) *Attorney, Agent, or Firm* — Oblon, McClelland, Maier & Neustadt, L.L.P.

(57) ABSTRACT

A motorcycle tire includes a tread having shoulder blocks, and sidewalls. Each shoulder block includes a main portion and an end portion. The main portion is formed by a first crosslinked rubber composition. The end portion and the sidewalls are formed by a second crosslinked rubber composition. JIS-A hardness Ha of the main portion is greater than JIS-A hardness Hb of the end portion and the sidewalls. Difference (Ha−Hb) is greater than or equal to 5, and is not greater than 12. A ratio (H2/H1) of a height H2 from a boundary point Pb between the tread and each sidewall to a boundary point P2 between the main portion and the end portion, relative to a height H1 from the boundary point Pb to an outermost end P1 of a corresponding one of the shoulder blocks in the axial direction, is greater than or equal to 1/3.

20 Claims, 2 Drawing Sheets

(56) References Cited

FOREIGN PATENT DOCUMENTS

JP        2011-057184        3/2011
WO     WO 2010/119959     * 10/2010

OTHER PUBLICATIONS

JP 2010-195059, Sep. 2010, English language machine translation, [http://worldwide.espacenet.com/publicationDetails/biblio?DB=worldwide.espacenet.com&II=1&ND=3&adjacent=true&locale=en_EP&FT=D&date=20100909&CC=JP&NR=2010195059A&KC=A].*

JP 2008-285081, Nov. 2008, English language machine translation, [http://worldwide.espacenet.com/publicationDetails/biblio?DB=worldwide.espacenet.com&II=1&ND=3&adjacent=true&locale=en_EP&FT=D&date=20081127&CC=JP&NR=2008285081A&KC=A].*

Extended European Search Report issued Apr. 18, 2013 in Patent Application No. 12199463.6.

"Shore (Durometer) Hardness Testing of Plastics", Matweb.com, XP-002694979, Retrieved from the Internet: URL:http://www.matweb.com/reference/shore-hardness.aspx, retrieved on Apr. 8, 2013.

* cited by examiner

MOTORCYCLE TIRE FOR UNEVEN TERRAIN

CROSS-REFERENCE TO RELATED APPLICATIONS

The present application is based upon and claims the benefit of priority from Japanese Application No. 2011-290318, filed Dec. 29, 2011, the entire contents of which are incorporated herein by reference.

BACKGROUND OF THE INVENTION

1. Field of the Invention

The present invention relates to tires suitable for motorcycles that run on uneven terrain such as mountain forests and wilderness.

2. Description of the Background Art

In uneven terrain, a road surface is uneven. When a motorcycle runs on the road surface, vibration is conveyed to the motorcycle. A load on a tire is low during normal running. The tire is required to exhibit vibration absorption under a low load.

A motorcycle running on uneven terrain repeats jumping and landing. A heavy load is applied to the tire upon landing. The tire is required to exhibit a high stiffness under a heavy load. A tire that exhibits a high stiffness under a heavy load is less likely to be twisted and squeezed upon landing. Further, in the tire, a so-called "snake bite" by a rim is less likely to occur. The "snake bite" refers to a phenomenon in which a tire is excessively deformed and portions of an inner surface of the tire abut against each other.

A crosslinked rubber having a high hardness needs to be used for a tread in light of traction performance. Motorcycle tires for uneven terrain are known in which a tread rubber and a sidewall rubber are formed of the same rubber material. In the tire, the sidewall rubber inevitably has its hardness increased. The tire exhibits poor vibration absorption under a low load.

Japanese Laid-Open Patent Publication No. 2008-285081 describes a motorcycle tire for uneven terrain in which sidewalls are softer than a tread. In the tire, vibration can be absorbed by the sidewalls that are soft. Japanese Laid-Open Patent Publication No. 2010-195059 also describes a motorcycle tire for uneven terrain in which a sidewall rubber and a tread rubber are formed of different rubber materials.

Japanese Laid-Open Patent Publication No. 2011-57184 describes a motorcycle tire for uneven terrain in which a rubber reinforcing layer is provided under a carcass. In the tire, the rubber reinforcing layer enables a high stiffness under a heavy load to be obtained.

The entire contents of these publications are incorporated herein by reference.

SUMMARY OF THE INVENTION

According to one aspect of the present invention, a motorcycle tire for uneven terrain includes a tread having, on an outer surface, blocks including shoulder blocks, a pair of sidewalls extending inward, in a radial direction, from ends, respectively, of the tread, a pair of beads disposed inward of the sidewalls, respectively, in an axial direction, and a carcass extending between one of the beads and the other of the beads along the tread and inner sides of the sidewalls. Each of the shoulder blocks includes a main portion and an end portion disposed inward of the main portion in the radial direction, the main portion includes a first crosslinked rubber composition, the end portion and the sidewalls include a second crosslinked rubber composition, a JIS-A hardness Ha of the main portion is greater than a JIS-A hardness Hb of the end portion and the sidewalls, a difference Ha−Hb of the hardness Ha from the hardness Hb is greater than or equal to 5, and is not greater than 12, and a ratio H2/H1 of a height H2 from a boundary point Pb between the tread and each of the sidewalls to a boundary point P2 between the main portion and the end portion, relative to a height H1 from the boundary point Pb to an outermost end P1 of a corresponding one of the shoulder blocks in the axial direction, is greater than or equal to 1/3.

According to another aspect of the present invention, a motorcycle tire includes a tread, a pair of sidewalls extending from ends of the tread, respectively, and a carcass extending along an inner surface of the tread and inner surfaces of the sidewalls. The tread has multiple shoulder blocks on an outer surface of the tread, each of the shoulder blocks in the tread includes a main portion including a first crosslinked rubber composition and an end portion including a second crosslinked rubber composition, the end portion is positioned inward of the main portion, the pair of sidewalls includes the second crosslinked rubber composition, the main portion has a JIS-A hardness Ha which is greater than a JIS-A hardness Hb of the end portion and pair of sidewalls, the pair of sidewalls and the main portion and end portion of each of the shoulder blocks satisfy a difference Ha−Hb of the hardness Ha and the hardness Hb, which is greater than or equal to 5 and not greater than 12, and the tread, the pair of side walls and the shoulder blocks satisfy a ratio H2/H1 which is greater than or equal to 1/3, where H2 is a height from a boundary point Pb between the tread and each of the sidewalls to a boundary point P2 between the main portion and the end portion, and H1 is a height from the boundary point Pb to an outermost end P1 of a corresponding one of the shoulder blocks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
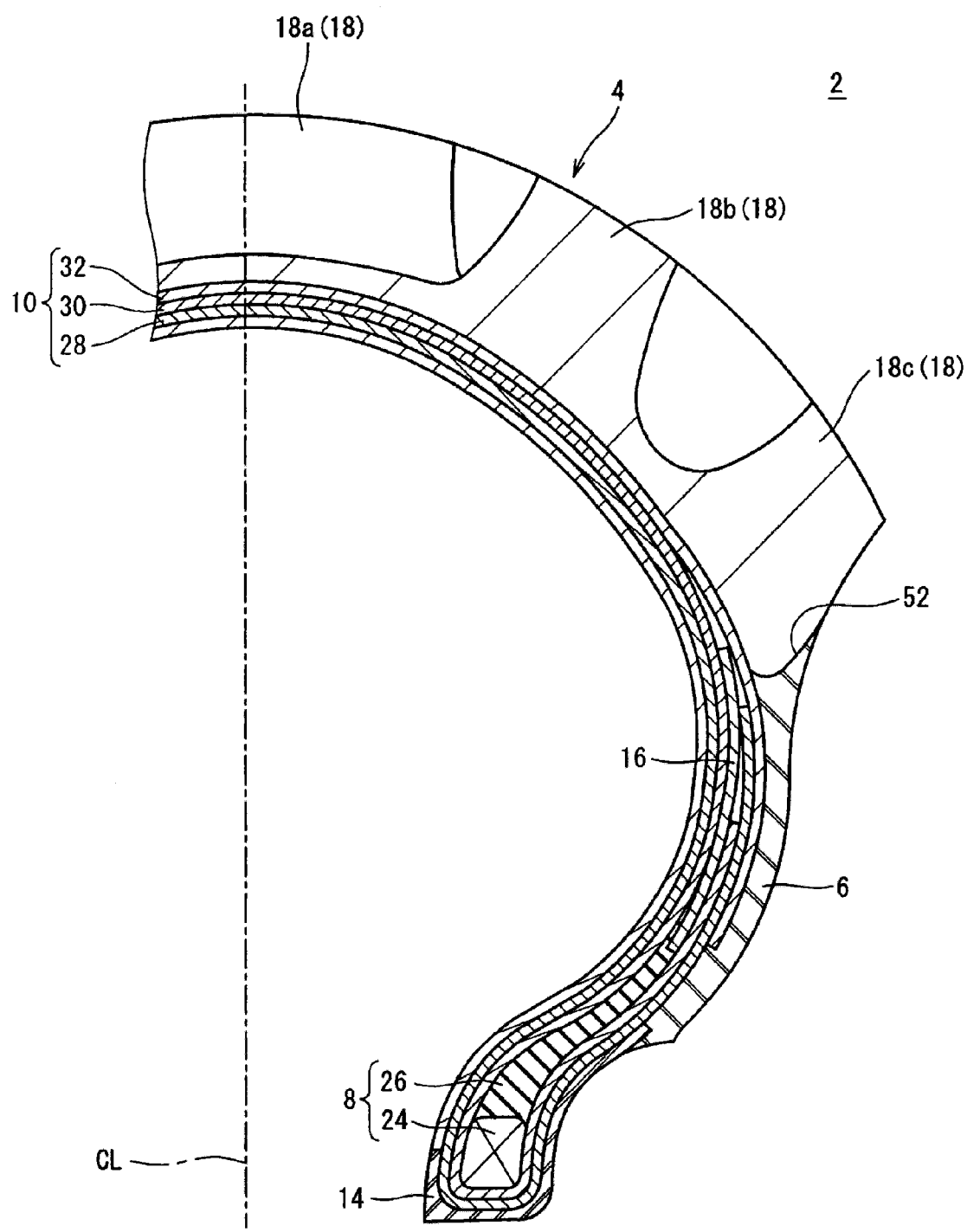
FIG. 1 is a cross-sectional view of a portion of a motorcycle tire for uneven terrain according to one embodiment of the present invention.

The embodiments will now be described with reference to the accompanying drawings, wherein like reference numerals designate corresponding or identical elements throughout the various drawings.

Figure 2:
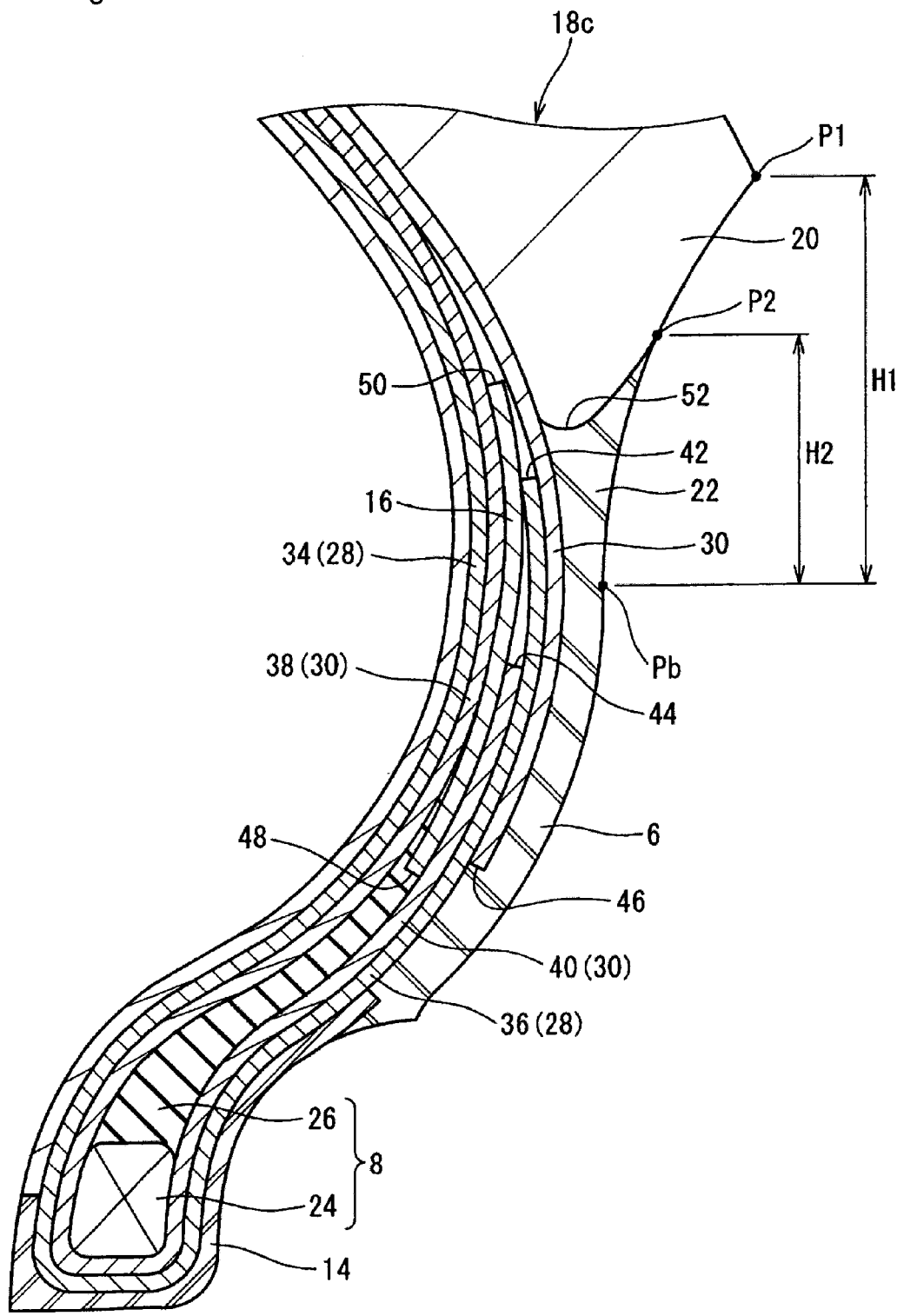
FIG. 2 is an enlarged cross-sectional view of a portion of the tire shown in FIG. 1.

FIG. 1 and FIG. 2 illustrate a motorcycle tire 2 for uneven terrain. In FIG. 1, the upward/downward direction represents the radial direction of the tire 2, the leftward/rightward direction represents the axial direction of the tire 2, and the direction orthogonal to the surface of the sheet represents the circumferential direction of the tire 2. In FIG. 1, an alternate long and short dash line CL represents the equator plane of the tire 2. The tire 2 has a shape that is symmetric with respect to the equator plane CL except for a tread pattern.

The tire 2 includes a tread 4, sidewalls 6, beads 8, a carcass 10, chafers 14, and reinforcing fillers 16. The tire 2 has a tube thereinside.

The tread 4 includes multiple blocks 18. The blocks 18 may be classified into a center block 18a, mid-blocks 18b, and shoulder blocks 18c. The center block 18a is disposed so as to pass through the equator plane CL. The mid-blocks 18b are disposed outward of the center block 18a in the axial direction. The shoulder blocks 18c are disposed outward of the mid-blocks 18b, respectively, in the axial direction. A block pattern is formed on the tread 4 by the blocks 18.

As shown in FIG. 2, each shoulder block 18c includes a main portion 20 and an end portion 22. The end portion 22 is disposed inward of the main portion 20 in the radial direction. Each main portion 20, the center block 18a, and the mid-blocks 18b are formed by a first rubber composition being crosslinked. The first rubber composition includes a base rubber that enables excellent wear resistance, heat resistance, and traction performance to be exhibited. The end portion 22 is formed by a second rubber composition being crosslinked.

The sidewalls 6 extend from ends, respectively, of the tread 4 in almost radially inward direction. In FIG. 2, reference character Pb represents a boundary point between the tread 4 and each sidewall 6. The boundary point Pb is positioned on a cross-sectional outer perimeter of the tire 2. A straight line (not shown) that passes through the boundary point Pb and is orthogonal to the cross-sectional outer perimeter is a border line between the tread 4 and each sidewall 6. The cross-sectional outer perimeter is formed so as to be convex outward in the axial direction in a region inward of the boundary point Pb in the radial direction. The cross-sectional outer perimeter is formed so as to be convex inward in the axial direction in a region outward of the boundary point Pb in the radial direction.

The sidewalls 6 are formed by the second rubber composition being crosslinked. In other words, the rubber composition of the sidewalls 6 is the same as the rubber composition of the end portion 22. Each sidewall 6 and the end portion 22 are integrally formed. The second rubber composition includes a base rubber that is excellent in vibration absorption, cut resistance, and weather resistance.

The beads 8 are disposed inward of the sidewalls 6, respectively, in the axial direction. Each bead 8 includes a core 24, and an apex 26 that extends outward from the core 24 in the radial direction. The core 24 is ring-shaped, and has a wound non-stretchable wire. A typical material of the wire is a steel. The apex 26 is tapered outward in the radial direction. The apex 26 is formed of a crosslinked rubber having a high hardness.

As shown in FIG. 1, the carcass 10 includes a first ply 28, a second ply 30, and a third ply 32. The first ply 28, the second ply 30, and the third ply 32 extend, along the tread 4 and the sidewalls 6, between the beads 8 disposed on both sides. The first ply 28 is turned up around the core 24 from the inner side to the outer side in the axial direction. The first ply 28 includes a main portion 34 and turned-up portions 36 due to the first ply 28 being turned up. The second ply 30 is turned up around the core 24 from the inner side to the outer side in the axial direction. The second ply 30 includes a main portion 38 and turned-up portions 40 due to the second ply 30 being turned up. Ends 42 of the turned-up portions 36 of the first ply 28 are positioned outward of ends 44 of the turned-up portions 40, respectively, of the second ply 30 in the radial direction. The third ply 32 is not turned up around the core 24. Portions near ends 46 of the third ply 32 are layered over the turned-up portions 36, respectively, of the first ply 28.

Each of the carcass plies 28, 30, and 32 includes multiple cords aligned with each other, and a topping rubber. An absolute value of an angle of each cord relative to the equator plane ranges from 20° to 65°. A tilt direction in which each cord of the second ply 30 tilts relative to the equator plane is opposite to a tilt direction in which each cord of the first ply 28 tilts relative to the equator plane. A tilt direction in which each cord of the third ply 32 tilts relative to the equator plane is opposite to the tilt direction in which each cord of the second ply 30 tilts relative to the equator plane. In other words, the carcass 10 forms a bias structure. The cords are formed of an organic fiber. Examples of the preferable organic fiber include nylon fibers, polyester fibers, aramid fibers, rayon fibers, and polyethylene naphthalate fibers. The carcass 10 may be formed of two plies. The carcass 10 may form a radial structure.

The chafers 14 are disposed near the beads 8, respectively. When the tire 2 is mounted to a rim, the chafers 14 abut on the rim. Portions near the beads 8 are protected due to the abutment. The chafers 14 are formed of a fabric and a rubber impregnated into the fabric.

The reinforcing fillers 16 are disposed inward of the sidewalls 6, respectively, in the axial direction. In the present embodiment, each reinforcing filler 16 is disposed outward of the main portion 34 of the first ply 28 and the main portion 38 of the second ply 30 in the axial direction. The reinforcing fillers 16 are disposed inward of the turned-up portions 36 of the first ply 28 and the turned-up portions 40 of the second ply 30 in the axial direction. In the reinforcing fillers 16 provided at these positions, a tensile stress is generated under a heavy load.

Each reinforcing filter 16 includes multiple cords aligned with each other, and a topping rubber. When a low load is applied to the tire 2, deformation of the tire 2 is small. Therefore, a tensile stress generated in the cords of the reinforcing fillers 16 is also small. Vibration absorption under a low load is not inhibited due to the reinforcing fillers 16. When a heavy load is applied to the tire 2, deformation of the tire 2 is great. Therefore, a tensile stress generated in the cords of the reinforcing fillers 16 is also great. The reinforcing fillers 16 can contribute to a high stiffness under a heavy load. The cords are formed of an organic fiber. Examples of the preferable organic fiber include nylon fibers, polyester fibers, aramid fibers, and rayon fibers.

Preferably, a material of the reinforcing fillers 16 is the same as a material of the first ply 28. In other words, a composition of the topping rubber of the reinforcing fillers 16 is the same as that of the first ply 28. Further, a material and a fineness of the cords of the reinforcing fillers 16 are the same as those of the first ply 28.

As is apparent from FIG. 2, portions near lower ends 48 of the reinforcing fillers 16 overlap the apexes 26, respectively, in the axial direction. Portions near upper ends 50 of the reinforcing fillers 16 overlap the main portion 20 of the shoulder blocks 18c, respectively, in the axial direction. The reinforcing fillers 16 thus formed can contribute to a high stiffness under a heavy load. As described below, each end portion 22 and the sidewalls 6 are soft. A stiffness of side portions of the tire 2 is increased by the reinforcing fillers 16. The tire 2 may not have the reinforcing fillers 16.

As described above, each main portion 20, the center block 18a, and the mid-blocks 18b are formed by the first rubber composition being crosslinked. On the other hand, each end portion 22 and the sidewalls 6 are formed by the second rubber composition being crosslinked. Each main portion 20, the center block 18a, and the mid-blocks 18b are relatively hard. Each main portion 20, the center block 18a, and the mid-blocks 18*b* enable excellent wear resistance and traction performance to be exhibited. On the other hand, each end portion 22 and the sidewalls 6 are relatively soft. Each end portion 22 and the sidewalls 6 contribute to vibration absorption under a low load.

A JIS-A hardness Ha of each main portion 20 is preferably greater than or equal to 65, and is preferably not greater than 95. The main portion 20 having a hardness Ha greater than or equal to 65, is excellent in wear resistance. In this viewpoint, the hardness Ha is particularly preferably greater than or equal to 70. The main portion 20 having a hardness Ha that is not greater than 95, enables excellent grip performance to be exhibited. In this viewpoint, the hardness Ha is particularly preferably not greater than 85.

A JIS-A hardness Hb of each end portion 22 and the sidewalls 6 is preferably greater than or equal to 53, and is preferably not greater than 90. Each end portion 22 and the sidewalls 6 having a hardness Hb greater than or equal to 53, are excellent in high stiffness under a heavy load. In this viewpoint, the hardness Hb is particularly preferably greater than or equal to 55. Each end portion 22 and the sidewalls 6 having a hardness Hb that is not greater than 90 are excellent in vibration absorption under a low load. In this viewpoint, the hardness Hb is particularly preferably not greater than 80.

A difference (Ha−Hb) of the hardness Ha from the hardness Hb is preferably greater than or equal to 5, and is preferably not greater than 12. The tire 2 in which the difference (Ha−Hb) is within the range described above, is excellent in wear resistance, vibration absorption under a low load, and stiffness under a heavy load. In this viewpoint, the difference (Ha−Hb) is particularly preferably greater than or equal to 8, and is particularly preferably not greater than 10.

The hardness Ha and the hardness Hb are measured by a JIS-A-hardness meter being pressed against a cross-section of the tire 2 shown in FIG. 1. The temperature at the measurement is 23° C.

In FIG. 2, reference character P1 represents an outermost end of each shoulder block 18*c* in the axial direction. Reference character H1 represents a height from the boundary point Pb to the outermost end P1. The height H1 is measured along the radial direction.

In FIG. 2, reference character P2 represents a boundary point between the main portion 20 and the end portion 22 in each shoulder block 18*c*. The boundary point P2 is a point on the cross-sectional outer perimeter and a border line 52 between the main portion 20 and the end portion 22. Reference character H2 represents a height from the boundary point Pb to the boundary point P2. The height H2 is measured along the radial direction.

A ratio (H2/H1) of the height H2 to the height H1 is preferably greater than or equal to 1/3. The tire 2 in which the ratio (H2/H1) is greater than or equal to 1/3 is excellent in vibration absorption under a low load. In this viewpoint, the ratio (H2/H1) is particularly preferably greater than or equal to 1/2. In light of steering performance obtained when the shoulder blocks 18*c* contact with the ground, and wear resistance of the shoulder blocks 18*c*, the ratio (H2/H1) is preferably not greater than 1/1. The entirety of the border line 52 is preferably included in a range which is higher than the boundary point Pb by at least 1/3 the height H1, and is higher than the boundary point Pb by at most 1/1 the height H1.

In the present invention, the dimension and angle of each component of the tire are measured in a state where the tire is mounted to a normal rim, and the tire is filled with air so as to obtain a normal internal pressure. During the measurement, no load is applied to the tire. In the description herein, the normal rim represents a rim which is specified according to the standard with which the tire complies. The "standard rim" in the JATMA standard, the "Design Rim" in the TRA standard, and the "Measuring Rim" in the ETRTO standard are included in the normal rim. In the description herein, the normal internal pressure represents an internal pressure which is specified according to the standard with which the tire complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure.

EXAMPLES

Hereinafter, effects of embodiments according to the present invention become apparent according to examples. However, the present invention should not be restrictively construed based on the description of examples.

Example 1

A front tire and a rear tire each of which includes shoulder blocks each having a main portion and an end portion, were produced. The size of the front tire was "90/100-21". The size of the rear tire was "120/80-19". In each tire, the JIS-A hardness Ha of each main portion, a center block, and mid-blocks was 75, and the JIS-A hardness Hb of each end portion and sidewalls was 67. Therefore, the difference (Ha−Hb) was 8. In each tire, the ratio (H2/H1) was 1/3.

Comparative Example 1

A front tire and a rear tire were produced in the same manner as in example 1 except that a rubber composition of end portions and sidewalls was the same as a rubber composition of main portions.

Examples 2 to 4 and Comparative Examples 2 to 4

A front tire and a rear tire were produced in the same manner as in example 1 except that a rubber composition of end portions and sidewalls was different such that the difference (Ha−Hb) was set to a value indicated below in Table 1 or Table 2.

Examples 5 to 8 and Comparative Example 5

A front tire and a rear tire were produced in the same manner as in example 1 except that a position of the boundary point P2 between a main portion and an end portion was different such that the ratio (H2/H1) was set to a value indicated below in Table 3.

Examples 9 to 11

A front tire and a rear tire were produced in the same manner as in example 1 except that reinforcing fillers were provided. The reinforcing fillers each had multiple cords formed of a nylon fiber, and a topping rubber. Portions near lower ends of the reinforcing fillers overlapped apexes, respectively, in the axial direction. Portion near upper ends of the reinforcing fillers overlap main portions, respectively, in the axial direction.

Running Test

The front tire and the rear tire were mounted to a motorcycle that had a four-stroke cycle engine having an engine displacement of 450 cc. The size of the front rim was "WM1.60". The size of the rear rim was "WM2.15". The internal pressure of each of the front tire and the rear tire was 80 kPa. The motorcycle was caused to run on a motocross course, and vibration absorption under a low load, a state of "snake bite" by the rim, a stiffness under a heavy load, and a steering performance at corners were evaluated by a rider. The results are indicated as indexes below in Table 1 to Table 4. The greater a value of the index is, the higher the evaluation is.

TABLE 1

| | Evaluation Results | | | |
|---|---|---|---|---|
| | Comparative example 1 | Comparative example 2 | Comparative example 3 | Example 2 |
| Ha-Hb (JIS-A) | 0 | −5 | 3 | 5 |
| H2/H1 | — | 1/3 | 1/3 | 1/3 |
| Position of reinforcing filler | — | — | — | — |
| Vibration absorption under low load | 100 | 90 | 100 | 110 |
| State of "snake bite" by rim | 100 | 90 | 100 | 110 |
| Stiffness under heavy load | 100 | 105 | 90 | 90 |
| Steering performance at corners | 100 | 100 | 100 | 100 |
| Comprehensive evaluation | 100 | 96 | 98 | 103 |

TABLE 2

| | Evaluation Results | | | |
|---|---|---|---|---|
| | Example 1 | Example 3 | Example 4 | Comparative example 4 |
| Ha-Hb (JIS-A) | 8 | 10 | 12 | 15 |
| H2/H1 | 1/3 | 1/3 | 1/3 | 1/3 |
| Position of reinforcing filler | — | — | — | — |
| Vibration absorption under low load | 120 | 120 | 120 | 115 |
| State of "snake bite" by rim | 120 | 120 | 120 | 120 |
| Stiffness under heavy load | 80 | 80 | 70 | 50 |
| Steering performance at corners | 100 | 100 | 100 | 100 |
| Comprehensive evaluation | 105 | 105 | 103 | 96 |

TABLE 3

| | Evaluation Results | | | | |
|---|---|---|---|---|---|
| | Comparative example 5 | Example 5 | Example 6 | Example 7 | Example 8 |
| Ha-Hb (JIS-A) | 8 | 8 | 8 | 8 | 8 |
| H2/H1 | 0 | 1/2 | 2/3 | 1/1 | 4/3 |
| Position of reinforcing filler | — | — | — | — | — |
| Vibration absorption under low load | 120 | 120 | 120 | 120 | 120 |
| State of "snake bite" by rim | 120 | 120 | 120 | 120 | 120 |

TABLE 3-continued

| | Evaluation Results | | | | |
|---|---|---|---|---|---|
| | Comparative example 5 | Example 5 | Example 6 | Example 7 | Example 8 |
| Stiffness under heavy load | 80 | 80 | 80 | 80 | 80 |
| Steering performance at corners | 60 | 100 | 100 | 100 | 90 |
| Comprehensive evaluation | 95 | 105 | 105 | 105 | 103 |

TABLE 4

| | Evaluation Results | | |
|---|---|---|---|
| | Example 9 | Example 10 | Example 11 |
| Ha-Hb (JIS-A) | 8 | 8 | 8 |
| H2/H1 | 1/3 | 1/3 | 1/3 |
| Position of reinforcing filler | *1 | *2 | *3 |
| Vibration absorption under low load | 120 | 110 | 120 |
| State of "snake bite" by rim | 120 | 120 | 120 |
| Stiffness under heavy load | 120 | 125 | 100 |
| Steering performance at corners | 100 | 100 | 100 |
| Comprehensive evaluation | 115 | 114 | 110 |

*1: Outward of main portion of second ply in the axial direction (FIG. 1)
*2: Outward of turned-up portion of first ply in the axial direction
*3: Inward of main portion of first ply in the axial direction As indicated in Table 1 to Table 4, the tires of examples are excellent in various performances. The evaluation results clearly indicate that embodiments of the present invention are superior.

A rider desires that vibration absorption under a low load and a high stiffness under a heavy load be realized in a highly balanced manner. The tire according to an embodiment of the present invention is mountable to various motorcycles.

According to an embodiment of the present invention, a motorcycle tire for uneven terrain includes: a tread having, on an outer surface, multiple blocks including shoulder blocks; a pair of sidewalls that extend almost inward, in a radial direction, from ends, respectively, of the tread; a pair of beads disposed inward of the sidewalls, respectively, in an axial direction; and a carcass that extends between one of the beads and the other of the beads along the tread and inner sides of the sidewalls. Each shoulder block includes a main portion and an end portion disposed inward of the main portion in the radial direction. The main portion is formed by a first rubber composition being crosslinked. The end portion and the sidewalls are formed by a second rubber composition being crosslinked. A JIS-A hardness Ha of the main portion is greater than a JIS-A hardness Hb of the end portion and the sidewalls. A difference (Ha−Hb) of the hardness Ha from the hardness Hb is greater than or equal to 5, and is not greater than 12. A ratio (H2/H1) of a height H2 from a boundary point Pb between the tread and each sidewall to a boundary point P2 between the main portion and the end portion, relative to a height H1 from the boundary point Pb to an outermost end P1 of a corresponding one of the shoulder blocks in the axial direction, is greater than or equal to 1/3.

Preferably, the ratio (H2/H1) is not greater than 1/1.

Preferably, the tire further includes reinforcing fillers disposed inward of the sidewalls, respectively, in the axial direction.

Each bead includes a core and an apex that extends outward from the core in the radial direction. Preferably, the apex overlaps a corresponding one of the reinforcing fillers in the axial direction. Preferably, the main portion overlaps a corresponding one of the reinforcing fillers in the axial direction.

Preferably, the reinforcing fillers each have multiple cords aligned with each other, and a topping rubber. Preferably, the cords are formed of a nylon fiber, a polyester fiber, an aramid fiber, or a rayon fiber.

The motorcycle tire for uneven terrain according to an embodiment of the present invention is excellent in vibration absorption under a low load. The tire exhibits a high stiffness under a heavy load.

Obviously, numerous modifications and variations of the present invention are possible in light of the above teachings. It is therefore to be understood that within the scope of the appended claims, the invention may be practiced otherwise than as specifically described herein.

What is claimed is:

1. A motorcycle tire for uneven terrain, comprising:
a tread having a plurality of blocks formed on an outer surface, the plurality of blocks including a plurality of shoulder blocks;
a pair of sidewalls extending inward from ends of the tread, respectively, in a radial direction;
a pair of beads disposed inward of the sidewalls, respectively, in an axial direction;
a carcass extending between one of the beads and the other one of the beads along the tread and inner sides of the sidewalls; and
a plurality of reinforcing filler portions disposed inward of the sidewalls, respectively, in the axial direction,
wherein each of the shoulder blocks includes a main portion and an end portion disposed inward of the main portion in the radial direction, the main portion comprises a first crosslinked rubber composition, the end portion and the sidewalls comprise a second crosslinked rubber composition, a JIS-A hardness Ha of the main portion is greater than a JIS-A hardness Hb of the end portion and the sidewalls, a difference Ha-Hb of the hardness Ha from the hardness Hb is greater than or equal to 5, and is not greater than 12, and a ratio H2/H1 of a height H2 from a boundary point Pb between the tread and each of the sidewalls to a boundary point P2 between the main portion and the end portion, relative to a height H1 from the boundary point Pb to an outermost end P1 of a corresponding one of the shoulder blocks in the axial direction, is greater than or equal to 1/3.

2. The motorcycle tire according to claim 1, wherein the ratio H2/H1 is not greater than 1/1.

3. The motorcycle tire according to claim 1, wherein each of the beads includes a core and an apex extending outward from the core in the radial direction, the apex overlaps a corresponding one of the reinforcing filler portions in the axial direction, and the main portion overlaps a corresponding one of the reinforcing filler portions in the axial direction.

4. The motorcycle tire according to claim 1, wherein each of the reinforcing filler portions has a plurality of cords aligned with each other, and a topping rubber, and the plurality of cords comprises at least one fiber material selected from the group consisting of a nylon fiber, a polyester fiber, an aramid fiber and a rayon fiber.

5. The motorcycle tire according to claim 2, wherein each of the beads includes a core and an apex extending outward from the core in the radial direction, the apex overlaps a corresponding one of the reinforcing filler portions in the axial direction, and the main portion overlaps a corresponding one of the reinforcing filler portions in the axial direction.

6. The motorcycle tire according to claim 2, wherein each of the reinforcing filler portions has a plurality of cords aligned with each other, and a topping rubber, and the plurality of cords comprises at least one fiber material selected from the group consisting of a nylon fiber, a polyester fiber, an aramid fiber and a rayon fiber.

7. The motorcycle tire according to claim 3, wherein each of the reinforcing filler portions has a plurality of cords aligned with each other, and a topping rubber, and the plurality of cords comprises at least one fiber material selected from the group consisting of a nylon fiber, a polyester fiber, an aramid fiber and a rayon fiber.

8. A motorcycle tire, comprising:
a tread;
a pair of sidewalls extending from ends of the tread, respectively;
a carcass extending along an inner surface of the tread and inner surfaces of the sidewalls; and
a plurality of reinforcing filler portions disposed over the inner surfaces of the sidewalls, respectively,
wherein the tread has a plurality of shoulder blocks on an outer surface of the tread, each of the shoulder blocks in the tread includes a main portion comprising a first crosslinked rubber composition and an end portion comprising a second crosslinked rubber composition, the end portion is positioned inward of the main portion, the pair of sidewalls comprises the second crosslinked rubber composition, the main portion has a JIS-A hardness Ha which is greater than a JIS-A hardness Hb of the end portion and pair of sidewalls, the pair of sidewalls and the main portion and end portion of each of the shoulder blocks satisfy a difference Ha-Hb of the hardness Ha and the hardness Hb, which is greater than or equal to 5 and not greater than 12, and the tread, the pair of side walls and the shoulder blocks satisfy a ratio H2/H1 which is greater than or equal to 1/3, where H2 is a height from a boundary point Pb between the tread and each of the sidewalls to a boundary point P2 between the main portion and the end portion, and H1 is a height from the boundary point Pb to an outermost end P1 of a corresponding one of the shoulder blocks.

9. The motorcycle tire according to claim 8, wherein the ratio H2/H1 is not greater than 1/1.

10. The motorcycle tire according to claim 8, further comprising a pair of beads disposed over the inner surfaces of the sidewalls, respectively, wherein each of the beads includes a core and an apex extending outward from the core, the apex overlaps a corresponding one of the reinforcing filler portions, and the main portion overlaps a corresponding one of the reinforcing filler portions.

11. The motorcycle tire according to claim 8, wherein each of the reinforcing filler portions has a topping rubber and a plurality of cords aligned with each other, and the plurality of cords is at least one fiber material selected from the group consisting of a nylon fiber, a polyester fiber, an aramid fiber and a rayon fiber.

12. The motorcycle tire according to claim 8, further comprising a pair of beads disposed over the inner surfaces of the sidewalls, respectively, wherein each of the beads includes a core and an apex extending outward from the core, the apex overlaps a corresponding one of the reinforcing filler portions, the main portion overlaps a corresponding one of the reinforcing filler portions, each of the reinforcing filler portions has a topping rubber and a plurality of cords aligned with each other, and the plurality of cords comprises at least one fiber material selected from the group consisting of a nylon fiber, a polyester fiber, an aramid fiber and a rayon fiber.

13. The motorcycle tire according to claim 10, wherein the ratio H2/H1 is not greater than 1/1.

14. The motorcycle tire according to claim 8, further comprising a pair of beads disposed over the inner surfaces of the sidewalls, respectively.

15. The motorcycle tire according to claim 8, further comprising a pair of beads disposed over the inner surfaces of the sidewalls, respectively, wherein the ratio H2/H1 is not greater than 1/1.

16. The motorcycle tire according to claim 11, further comprising a pair of beads disposed over the inner surfaces of the sidewalls, respectively.

17. The motorcycle tire according to claim 11, further comprising a pair of beads disposed over the inner surfaces of the sidewalls, respectively.

18. A motorcycle comprising the motorcycle tire according to claim 8.

19. The motorcycle tire according to claim 9, wherein each of the reinforcing filler portions has a topping rubber and a plurality of cords aligned with each other, and the plurality of cords is at least one fiber material selected from the group consisting of a nylon fiber, a polyester fiber, an aramid fiber and a rayon fiber.

20. The motorcycle tire according to claim 8, wherein each of the reinforcing filler portions has a topping rubber and a plurality of cords aligned with each other.

\* \* \* \* \*